March 1, 1960 S. B. MARTIN 2,926,655
FRANKFURTER OVEN
Filed Oct. 18, 1956 4 Sheets-Sheet 3
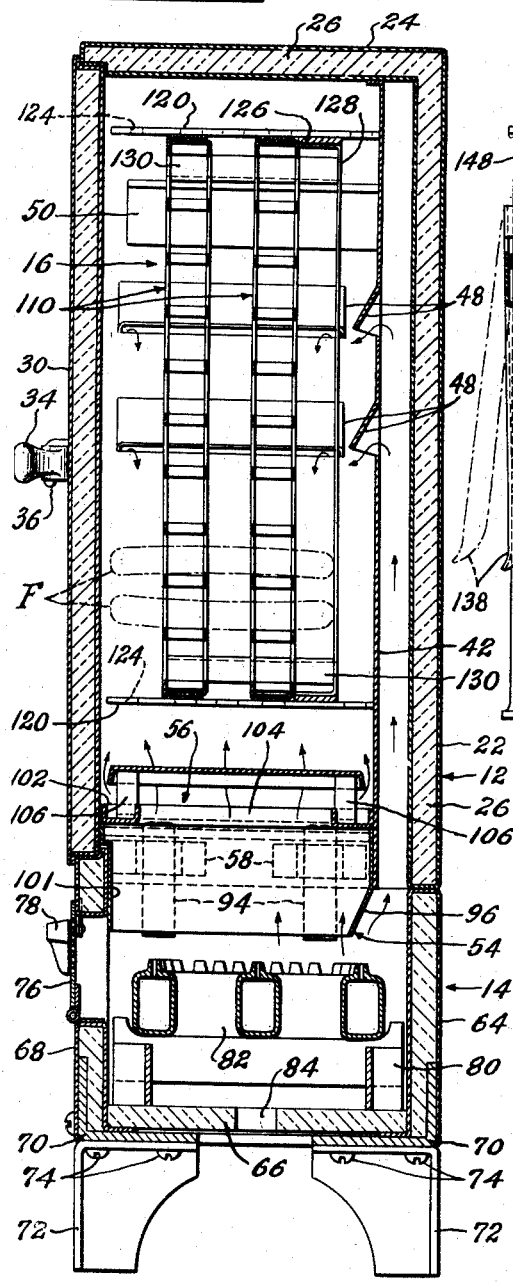
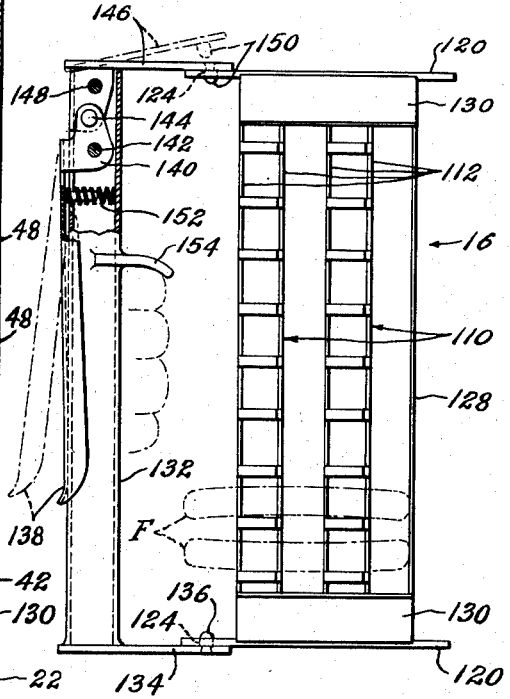
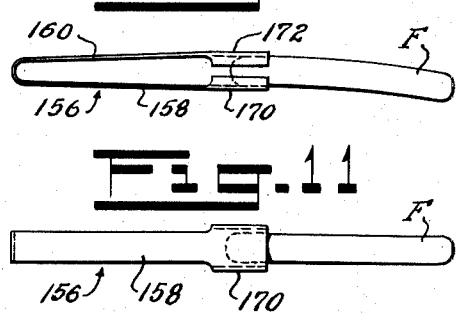
INVENTOR.
STERLING B. MARTIN
BY James J. Cannon
ATTORNEY

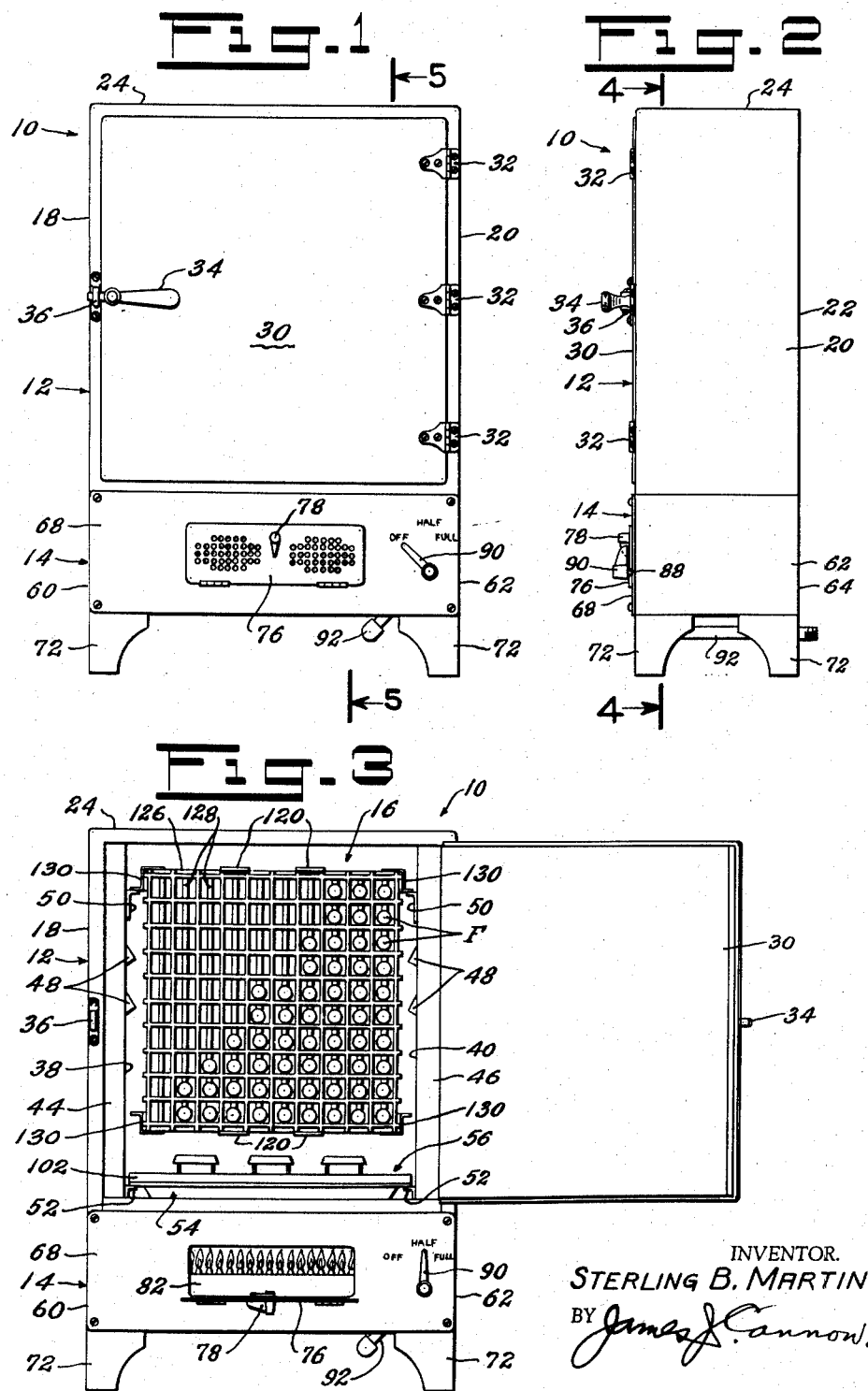

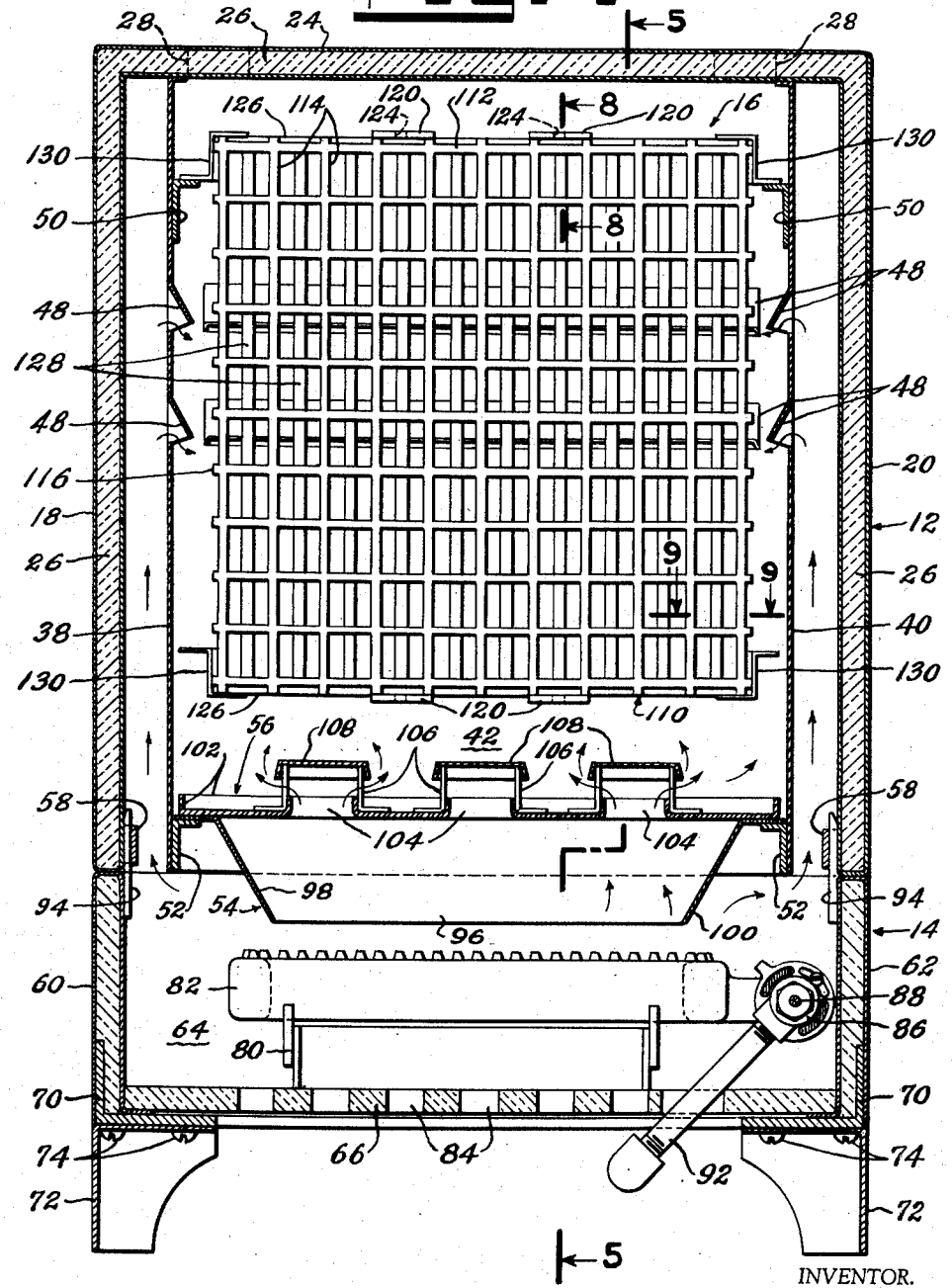

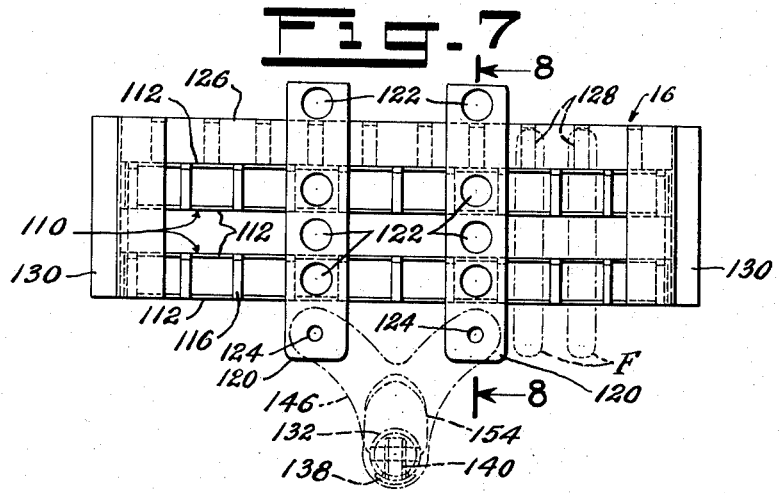
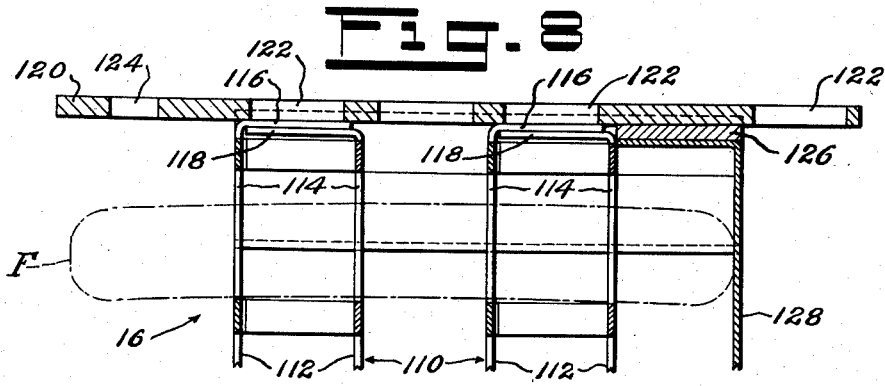
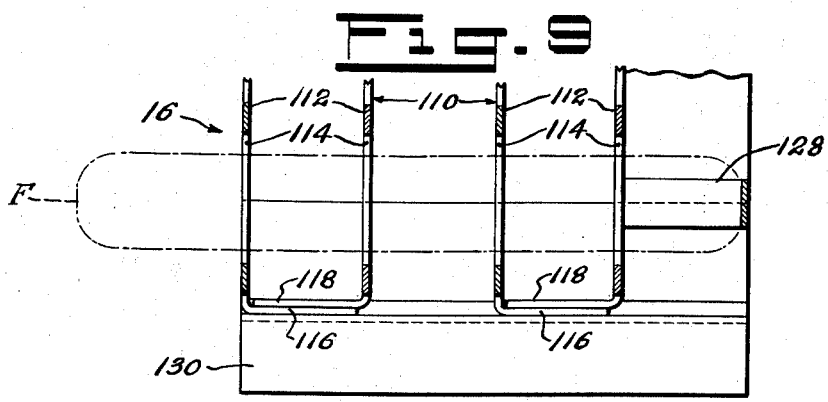
INVENTOR.
STERLING B. MARTIN
BY
ATTORNEY

United States Patent Office 2,926,655
Patented Mar. 1, 1960

2,926,655

FRANKFURTER OVEN

Sterling B. Martin, Hawthorne, N.J.

Application October 18, 1956, Serial No. 616,706

1 Claim. (Cl. 126—21)

My invention relates generally to cooking ovens and is directed particularly to an improved oven for the roasting of frankfurters or "hot dogs" in large quantities.

Frankfurters are commonly cooked by boiling, deep frying, barbecuing and griddle frying. All of these methods are deficient in various respects. For example, in boiling most of the flavor and natural juices of the frankfurters are lost in the water so that they become flat and tasteless. Also, excessive heat is required to boil the large quantities of water needed.

Deep fry cooking methods require large amount of expensive shortening. Heat consumption is heavy. In melting the shortening the temperature must be brought up slowly and watched constantly to prevent burning. Cleaning the deep fry unit, which must be done frequently, is a difficult task. Frankfurters cooked by the deep fry method moreover have a tendency to burst their skins, release much of their juices and flavor, and become grease-soaked and tough-skinned.

In barbecueing, motor driven barbecue units require excessive heat because individual frankfurters are under direct heat only for short periods of time. The cooking process is also slow for this reason. The motor drive consumes electrical energy while the unit is operating. Many barbecue roasters, moreover, require the frankfurters to be impaled on wire spikes, which puncture the skin and release the natural juices and flavor. In barbecue grill cooking, there is lack of heat control, so that the frankfurters are unevenly roasted, often to the extent that their skins burst open to release the natural juices and impair flavor. Even the larger barbecue grills have low capacity output because of the space required for each frankfurter. Constant attention is required, moreover, to properly supervise the cooking process.

In cooking frankfurters on a grill, heat is applied to only a small section of a frankfurter surface at a time so that frequent attention for turning is required. This method is also slow, and the frankfurters often acquire a burned or tough leathery indigestible skin. Quantity grilling requires a large surface and excessive heat consumption.

It is the principal object of my invention to provide an oven for roasting frankfurters in large quantities which overcomes the various disadvantages of commonly used frankfurter cooking methods as listed above.

It is a more particular object of my invention to provide an oven for roasting frankfurters in large quantities which is small in size, efficient in operation, which requires a minimum of attention, which is easy to clean, and which roasts the frankfurters evenly from all sides by hot air alone in such a way that their skins are not scorched or ruptured but remain tender and undamaged so that the frankfurters will be tender, flavorful and succulent.

Another object of my invention is to provide a frankfurter oven of the above nature which comprises an oven unit, a removable frankfurter rack supported in the oven unit, and baffled hot air heating means operative to evenly distribute hot air throughout the frankfurter rack for uniform cooking.

Another object of my invention is to provide a frankfurter oven of the character described including a heating unit detachably mounted beneath the oven unit for supplying the hot air for roasting.

Another object is to provide a frankfurter oven of the character described wherein the oven unit containing the frankfurter rack can, if desired, be placed directly upon a grill for heat supply.

Another object of the invention is to provide a frankfurter oven of the character described which can be used with various types of heating fuels, such as gas, propane gas, alcohol, pressure gasoline, charcoal, as well as with electric infra-heating units.

Another object of my invention is to provide a frankfurter roasting oven of the character described including a simple mechanism for readily removing and replacing the frankfurter rack in the oven.

Still another object of my invention is to provide a device for inserting and removing the individual frankfurters in the cooking rack.

Other objects, features and advantages of the invention will be apparent from the following detailed description when considered with reference to the accompanying drawings. In the drawings, wherein like reference numerals denote corresponding parts throughout the several views:

Fig. 1 is a front view of the improved frankfurter roaster embodying my invention, Fig. 2 is a side view of the same, Fig. 3 is a front view similar to Fig. 1 but with the oven and burner doors open, Fig. 4 is a vertical cross-sectional view taken along line 4—4 of Fig. 2, Fig. 5 is a vertical cross-sectional view taken along the line 5—5 of Figs. 1 and 4, Fig. 6 is a side elevational view of the frankfurter rack and the detachable handle device for moving the rack in and out of the oven, Fig. 7 is a top view of the same, Fig. 8 is a vertical cross-sectional detail of the frankfurter rack taken along the line 8—8 in Figs. 4 and 7, Fig. 9 is a horizontal cross-sectional detail of the frankfurter rack taken along the line 9—9 in Fig. 4, Fig. 10 is a plan view of a grasping implement for inserting and removing frankfurters from the roasting rack, and Fig. 11 is a side elevational view of the same.

Referring now to the drawings, the numeral 10 indicates generally the improved frankfurter roaster embodying my invention, the same comprising broadly an oven unit 12, an interfitting heater unit 14, and a frankfurter rack 16.

The oven unit 12 is a box-like structure having double panelled side walls 18, 20, a double-panelled back wall 22 and a double-panelled top wall 24, each of said walls being filled with heat insulation material 26. The top wall 24 is provided with a pair of openings 28 for escape of hot air circulating within the oven unit, as is hereinbelow more fully described. A double-panelled, insulation-filled oven door 30 is hinged at one side by hinges 32 to the open edge of the side-wall 20 of the oven unit, and is fitted at its other side with a latch handle 34 cooperative with a latch hook member 36 secured to the open edge of the side wall 18 for securing the oven door in closed position.

The inside of the oven unit 12 is provided with partitioning walls 38, 40 and 42 fixed in spaced parallel relation with respect to the side walls 18 and 20 and the back wall 22, respectively. The partitioning walls 38 and 40 are integrally formed with front vertical wall portions 44 and 46, respectively (see Fig. 3) forming side chambers open only at the bottom of the oven unit 12. The walls 38, 40 and 42 are formed with downwardly-directed louvres 48 which serve to uniformly distribute hot air throughout the oven for evenly roasting the frankfurters, as is herein below more fully described. Side walls 38 and 40 are fitted with a pair of opposed, horizontally fixed upper angle iron brackets 50 adapted to support the frankfurter rack 16. The side walls 38 and 40 are further fitted with a pair of horizontally fixed lower angle iron brackets 52 adapted to slidingly support a heat deflector 54 and a drip pan 56.

Each of side walls 18, 20, of the oven unit 12 is provided, near its lower end at the inside, with a pair of strap loops 58 adapted to receive locating and securing lugs extending upwardly from the top of the heater unit 14, as is herein below described.

The heater unit 14 comprises double-panelled, insulated side walls 60, 62, a double panelled insulated back wall 64, an insulated bottom wall 66 and a screwed-on double-panelled insulated front wall 68, said walls being reinforced by the angle iron frame member 70. The heater unit 14 is supported above the flooring by means of legs 72 secured to the angle iron frame member 70 by means for example of screws 74.

The front wall 68 is provided with a central rectangular opening against the lower edge of which is hinged an observation and fuel lighting door 76. The door 76 is provides with a latch member 78 enabling the door to be locked in upward closed position.

A metal burner rack 80 rests against the bottom of the enclosure of the heater unit 14 for supporting a generally rectangular gas burner 82 at a slightly elevated position above the bottom wall 66 of said heater unit, said bottom wall being provided with a plurality of openings 84 for supplying air to be heated by said burner. The gas burner 82 has an air adjusted valve 86 the stem 88 of which extends through an opening in the front wall 60. The valve 86 is adjusted by means of the handle 90. A gas conduit pipe 92 for the burner 82 extends through the bottom wall 66 and out beyond the rear of the heater unit 14 for connection to a gas supply main (see Fig. 2). The upper ends at the insides of the side walls 60 and 62 of the heater unit 14 are provided with upwardly-extending securing lugs 94 operative to fit into the strap loops 58 in the oven unit 12 for securing said units in interjoined relation.

The heat deflector 54 has a central opening flanged by an inwardly divergent downwardly-extending back deflector portion 96, inwardly-divergent and downwardly-extending side deflector portions 98 and 100, and a vertically downwardly-extending front portion 101. It will be apparent from an inspection of Figs. 4 and 5 that while the greater portion of the heat travels upwardly through the central opening of the heat deflector 54, the side and back deflector portions 96, 98 and 100 thereof serve to deflect peripheral portions of heat from the burner into the side and back chambers of the oven unit 12 formed by the partitioning walls 38, 40 and 42 therein. The hot air thus deflected is conveyed through the various side and back louvres 48 to evenly distribute the hot roasting air to all zones of the oven.

The drip pan 56 is formed of a flat plate and has a short upstanding peripheral wall 102 and three transverse flanged openings 104. The flanged openings 104 are provided at each corner with upstanding angle members 106 which form a support against their upper ends for three loosely placed front-to-back rectangular baffle caps 108. By means of this structure a greater amount of heated air is directed around its baffle caps 108, as shown by the arrows indicating hot air flow in Figs. 4 and 5, thereby allowing a greater amount of hot air to flow upwardly into the oven unit 12, and still function as a drip pan.

The frankfurter rack 16 comprises an aligned pair of spaced-parallel support grid structures 110, each of which is comprised of two spaced parallel support plates 112 punched with regularly spaced square openings 114. (See Fig. 4.) The support plates 112 are interjoined by bending over and spot welding together respective cut ends 116, 118, as is best seen in Figs. 8 and 9. The grid structures 110 are secured together by means of a pair of front-to-back flat support irons 120 welded or otherwise securely fixed against each vertical end of the rack. The support irons 120 are drilled as indicated at 122 so as not to seriously impede the free circulation of roasting hot air in the oven. The front ends of each of the support irons 120 are provided with small drilled openings 124 for cooperation with a rack carrying handle, as is hereinbelow more fully described. The rack 16 is strengthened by upper and lower transverse strap irons 126 welded along the inner sides of the front-to-back support irons 120 near the rear end thereof and adjacent the rear grid structure 110. A plurality of vertically-extending metal strips 128 are fixed between the rearmost edges to the transverse strap irons 126, said straps being so spaced as to serve as back stops for frankfurters F placed in the individual rack openings (see Figs. 8 and 9). The rack 16 is also provided at each corner with a front-to-back angle iron 130 which lends additional strength to the rack structure and which provide at each vertical end of the rack a pair of opposed guide rails allowing sliding placement of said rack within the oven unit 12 supported on the upper iron brackets 52 therein. In placing the rack 16 in the oven unit 12 (see Fig. 5) the rear ends of the rack support support irons 120 in abutting the rear partition wall 42 in said oven unit serve to properly locate the rack within the oven. It is also to be noted that the rack 16 is symmetrical in design, so that it can be placed in the oven unit with either vertical end up.

A handle is provided for removing and replacing the rack 16 in the oven unit 12 (see Figs. 6 and 7), the same comprising a tubular member 132 having fixed at one end a V-shaped plate 134 each arm of which has an upstanding pin 136. The pins 136 are spaced to fit into the openings 122 of each pair of rack support irons 120. A curved manual control lever 138 has an upper end portion 140 extending within a side opening in the tubular member 132 and is pivoted therein by a pivot pin 142. The upper end portion 140 of the control lever 138 is in the form of a bell-crank, the free arm of which is linked by a pivot pin 144 to one end of a locking member 146 pivoted within the tubular member 132 by a pivot pin 148. The locking member 146 extends outwardly from the top of the tubular member 132 and is similar in shape to the plate 132 at the other end of said tubular member. The locking member 146 is similarly provided with a pair of downwardly-extending pins 150 for engaging the openings 122 in the rack support iron pins 120. A compression spring 152 within the tubular member 132 normally urges the manual control lever 138 in the outward direction so that the locking member 146 is normally held in upward, unlocking position as indicated by the broken line representation in Fig. 6. Upon squeezing the control lever 138 against the tubular member 132 by the palm of the hand, the locking member 146 will be moved downwardly to engage the openings 122 in the rack support iron pairs 120 as shown in the full line representation in Fig. 6, whereby the frankfurter rack 16 can readily be taken from or installed in the oven. A hand stop 154 is preferably provided on the tubular member 132.

Figs. 10 and 11 illustrate an implement 156 for inserting and removing frankfurters from the rack 16, the same being made preferably of an integral piece of resilient metal and comprising double-bent side portions 158, 160 terminating in complementary arcuate grasping tongue portions 170, 172.

It will be apparent from the foregoing description that my improved frankfurter oven, because of the ease with which it can be disassembled, can be thoroughly cleaned without difficulty in a short time. The oven unit 12, moreover, being completely separable from the heater unit 14, is small enough so that it can be set directly upon a standard gas range or grill for utilizing heat therefrom. The oven unit, by use of appropriate oven baskets instead of the frankfurter rack 16, can also be converted to use as a quantity production bread toaster or as an oven for preparing hot hors d'oeuvres for use in bars and cocktail lounges.

While there is disclosed in this specification one form in which my invention may be embodied in practice, it is to be understood that this form is shown for the purpose of illustration only, and that the invention is not limited to the disclosure, but may be modified and embodied in various other equivalent forms without departing from its spirit. In short, the invention includes all the modifications and embodiments coming within the scope of the following claim.

I claim:

An oven comprising a housing divided into an upper cooking chamber and a lower heater chamber, a heating unit housed in said heater chamber, a partitioning wall separating the marginal portion of the cooking chamber from the remainder thereof, said wall forming a heat flow conduit closed at the upper end thereof for directing heated air upwardly of said heater, a plurality of louvre openings formed in said partitioning wall near the upper end thereof for directing heated air downwardly into upper zones of the cooking chamber, a baffle located between said heater and said cooking chamber for impeding the flow of heated air directly into the cooking chamber while directing the flow of heated air into said conduit for evenly heating said cooking chamber, said baffle completely shielding the cooking chamber from undeflected heated air emanating from the heating chamber, and comprising a centrally apertured plate extending transversely of the housing, said plate having an inwardly inclined heat deflecting wall extending downwardly therefrom for directing heated air into the lower end of said conduit, and a second transverse plate above said apertured plate and extending across said central aperture, said second plate having a plurality of elongated openings formed therein, a heat deflection cap for each of said openings, each cap being coextensive with its respective opening and spaced therefrom for further deflecting the heated air stream.

References Cited in the file of this patent

UNITED STATES PATENTS

| | | |
|---|---|---|
| 762,459 | Yore | June 14, 1904 |
| 2,136,658 | Westberg et al. | Nov. 15, 1938 |
| 2,566,553 | Cline | Sept. 4, 1951 |
| 2,626,559 | Rau | Jan. 27, 1953 |

FOREIGN PATENTS

| | | |
|---|---|---|
| 545,291 | Germany | Feb. 27, 1932 |
| 867,947 | Germany | Feb. 23, 1953 |